United States Patent

Erlichman

[15] 3,678,830

[45] July 25, 1972

[54] PHOTOGRAPHIC APPARATUS

[72] Inventor: Irving Erlichman, Wayland, Mass.

[73] Assignee: Polaroid Corporation, Cambridge, Mass.

[22] Filed: Jan. 2, 1970

[21] Appl. No.: 318

[52] U.S. Cl. ....................195/13 R, 95/22

[51] Int. Cl. ....................G03b 17/52

[58] Field of Search....................95/13, 14, 19, 22, 30, 66

[56] References Cited

UNITED STATES PATENTS

| | | | |
|---|---|---|---|
| 641,268 | 1/1900 | Chase | 95/30 |
| 458,907 | 9/1891 | Kipper et al. | 95/19 |
| 458,981 | 9/1891 | Perry | 95/19 |
| 3,511,152 | 5/1970 | Erlichman | 95/93 X |
| 2,496,630 | 2/1950 | Land | 95/13 |

*Primary Examiner*—John M. Horan
*Assistant Examiner*—Alan A. Mathews
*Attorney*—Brown and Mikulka and Donald P. Selvecki

[57] ABSTRACT

A processing chamber drives an element for engaging an exposed film unit to move the exposed film unit from an exposure position to an intermediate position. At least one relatively thin pivotable arm operates a slide carrying a pick element, the arm being actuated by a translationally reciprocable processing chamber during the initial portion of its travel. An exposed film unit is thereby transported from an exposure position to a position where the exposed film unit engages pressure-applying members that distribute a processing composition across the exposed photosensitive element.

22 Claims, 13 Drawing Figures

INVENTOR.
IRVING ERLICHMAN
BY Brown and Mikulka
and
Donald L. Seluecki
ATTORNEYS

INVENTOR.
IRVING ERLICHMAN

BY Brown and Mikulka
and
Donald A. Sabacki
ATTORNEYS

PATENTED JUL 25 1972

3,678,830

INVENTOR.
IRVING ERLICHMAN

BY Brown and Mikulka
and
Donald P. Saluecki
ATTORNEYS

INVENTOR.
IRVING ERLICHMAN

BY Brown and Mikulka
and
Donald P. Selwacki
ATTORNEYS

INVENTOR.
IRVING ERLICHMAN

BY Brown and Mikulka
and
Donald R. Seluecki
ATTORNEYS

PHOTOGRAPHIC APPARATUS

BACKGROUND OF THE INVENTION

1. Field of the Invention

This invention relates to photographic apparatus and, more particularly, to means for moving an exposed film unit from an exposure position to a position in the photographic apparatus where processing composition is to be distributed thereacross.

The apparatus of the present invention finds utility in a camera of the type described in Ser. No. 763,883, filed Sept. 20, 1968, in the name of Irving Erlichman and assigned to the same assignee as the present invention and now U.S. Pat. No. 3,589,253. The film unit, especially adapted for use with the above-mentioned camera, is described in Ser. No. 622,826, filed Mar. 10, 1967, in the name of Edwin H. Land et al and assigned to the same assignee as the present invention, and now abandoned. The film unit in the above-mentioned application is a type using a diffusion transfer process and is best described in U.S. Pat. No. 3,415,644, issued Dec. 10, 1968, in the name of Edwin H. Land and assigned to the same assignee as the present invention. The present invention is operated by a processing chamber of the type described in my copending application Ser. No. 179, filed Jan. 2, 1970, assigned to the same assignee as the present invention.

In the operative environment set forth in the above-mentioned applications and patents, the pervading theme is compactness and automatic operation. Along with these desirable characteristics, the film unit described has no components that do not form a portion of the finished photograph. That is to say, a photosensitive element in a film unit is exposed to a scene to be recorded and the remainder of the processing of the exposed film unit takes place automatically with all parts of the original film unit retained in the finished photograph. The film unit of the type above described is normally stacked in a cartridge or film container with the uppermost film unit being positioned on an exposure plane prior to exposure. A suitable shutter mechanism is actuated to expose a scene to be recorded with the development of a visible image being brought about by the diffusion transfer process. The film unit is of the type wherein a photosensitive element is covered by a transparent sheet which readily transmits an image of the scene to be recorded to the photosensitive element. Almost immediately after exposure, a processing composition is spread between the exposed photosensitive element and the transparent sheet. The present invention is concerned with apparatus for moving an exposed photosensitive element in such a film unit from an exposure position to an intermediate position where the distribution of the processing composition commences.

Another important characteristic of such a camera is the compactness, either when in a stored configuration or in an operative configuration. In other words, the camera above-mentioned, either when carried from place to place non erected or when erected and operative, is compacted into the smallest possible package so as to avoid excess bulk. The camera when erected has a configuration in which the camera has an increased volume, but all of the operative components of the camera as erected fit into the very minimal size configuration able to house the operative components when the camera is inoperative. Consequently, apparatus for moving an exposed photosensitive element from an exposure position to a position where the processing composition is to be distributed must occupy a very minimum of space when the camera is either erected or folded and must further be compatible with the desirable compact camera and the film format using the diffusion transfer process. Accordingly, the present invention has the twofold purpose of being able to very accurately position, in succession, a series of exposed photosensitive elements to a position where development of the recorded image commences while being completely compatible with the compact camera used for recording the image.

2. Prior Art

Various devices are shown in the prior art for engaging a film unit disposed in a cartridge or container of film units and selectively advancing the uppermost film unit to a position where processing composition is to be distributed thereacross. For example, in Ser. No. 860,445, filed in the name of Douglas B. Tiffany and assigned to the same assignee as the present invention, a roller is utilized for moving an exposed film unit from a film container. Whereas this type of pick, as such a device is known in the art, can accomplish moving the film unit from one position to another, it is not adaptable for use with a camera of the type herein described having a translationally reciprocable processing chamber. That is to say, the pick mechanism shown in the above-mentioned application contains moving parts and apparatus that are not adaptable for use in a camera where a processing chamber of the type above described is utilized.

Other prior art devices are illustrated in Ser. No. 713,766, filed Mar. 18, 1968, in the name of Irving Erlichman, and now U.S. Pat. No. 3,511,152; Ser. No. 743,441, filed July 9, 1968, in the name of Leonard V. Bendoni, and now U.S. Pat. No. 3,563,145; Ser. No. 764,142, filed Oct. 1, 1968, in the name of Irving Erlichman et al and now U.S. Pat. No. 3,545,357 and Ser. No. 179, filed Jan. 2, 1970, all assigned to the same assignee as the present invention. However, with the exception of the mechanism shown in Ser. No. 179, the pick mechanisms are not adapted for use with a processing chamber and would adversely contribute to the cost of manufacturing the camera if extensively modified so as to operate therewith. With respect to Ser. No. 179, the pick mechanism shown therein is operative in the environment suggested herein but requires increased manufacturing technology and cost that can be effectively reduced by the use of the present invention. Otherwise the prior art has not responded to the problem herein set forth and therefore is inapplicable.

OBJECTS OF THE INVENTION

It is an object of the present invention to provide improved photographic apparatus wherein exposed photosensitive elements are selectively and sequentially engaged and moved to another position where the distribution of processing composition across a selected exposed photosensitive element is commenced.

It is another object of the present invention to provide improved photographic apparatus in accordance with the previous object wherein the photographic apparatus utilizes a translationally reciprocable processing chamber.

It is still another object of the present invention to provide improved photographic apparatus wherein the uppermost exposed photosensitive elements in a stack of photosensitive elements are selectively engaged and moved to a position where a processing composition is spread thereacross and wherein the apparatus for engaging the exposed photosensitive element is moved by a processing chamber.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

SUMMARY OF THE INVENTION

Briefly, I accomplish the foregoing objects by providing a pick mechanism that is driven throughout its range of movement by a processing chamber. The pick mechanism has a minimal thickness and therefore occupies a minimum space within the main body of the photographic apparatus whether the apparatus is in an erected or non-erected condition. More specifically, at least one pivotable arm is positioned in interference with projections on the rack that drives the processing chamber. The arm is pivoted at one end with an opposite end being engageable with the projections. At some point intermediate its ends, provision is made for engagement of the arm with a slide movable in a slot with a slide carrying a pick member. The projections on the rack are offset with respect to each other and to the direction of movement of the rack so that the projection contacting the arm as the rack moves outwardly slides relative to the arm until the arm swings out of engagement therewith. The mechanism is designed so that this disengagement occurs when the slide has moved to the end of the slot in which it moves, and the photosensitive element has come into engagement with the processing rollers. The rack then continues outwardly with the pick mechanism being disabled. As the rack returns into the photographic apparatus, one of the projections on the rack picks up the arm and drives it to a poised position wherein the pick member engages another photosensitive element. This completes the cycle.

Desirably, the above-mentioned cycle takes place automatically, for example, electrically. The movement of the photosensitive element from its stored position in a film container and the movement of the processing chamber consumes power during its operation. The distributing of the processing composition involves the rupturing of a container of processing composition, and this likewise takes power. Significantly, these power requirements primarily exist during the beginning of the cycle when the photosensitive element is moved from the exposure position. On the return movement of the processing chamber, power requirements are at a minimum. The present invention has the additional feature of providing a spring acting against the arm which constantly urges the arm toward the pressure-applying rollers. Therefore, during the initial part of the cycle when the power requirements are highest, the spring assists the pick mechanism of the present invention in its operation and, therefore, tends to balance the load on the electrical motor.

For a fuller understanding of the nature and objects of the invention, reference should be had to the following detailed description taken in connection with the accompanying drawings.

DETAILED DESCRIPTION OF THE INVENTION

Figure 1:
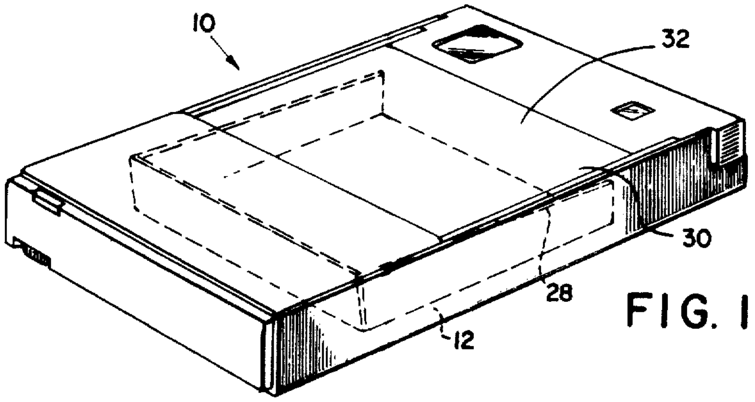
FIG. 1 is a perspective view of the photographic apparatus of the present invention with the apparatus shown in the nonerected condition.
Figure 2:
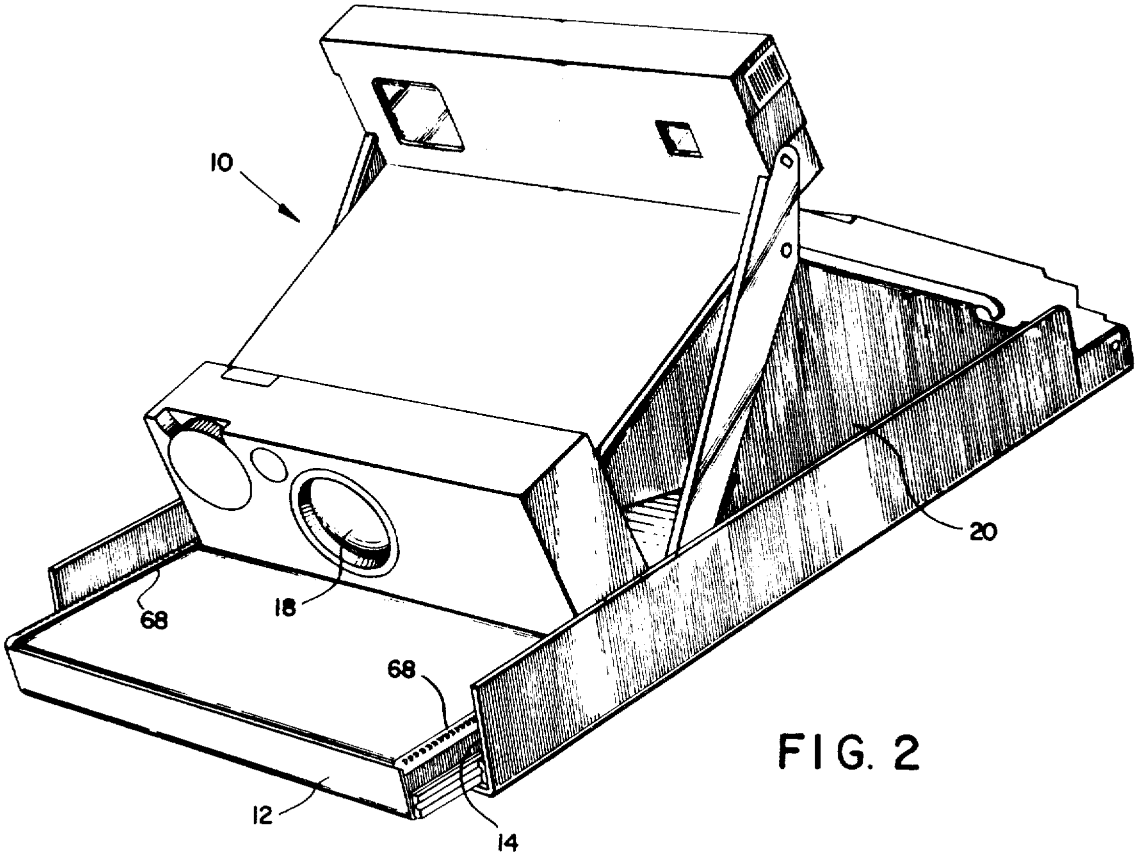
FIG. 2 is a perspective view of the photographic apparatus of the present invention shown in the erected condition.

Referring to FIG. 1, the compact camera 10 of the present invention is illustrated in a nonerected configuration. When so configured, camera 10 is inoperative and occupies the very minimal volume necessary to house the operative components thereof. The processing chamber 12 is illustrated in dotted line form and presents a lighttight environment for an exposed photosensitive element as it is moved to a storage position. Referring to FIG. 2, processing chamber 12 is shown in a partially extended position in order to more clearly illustrate its operative configuration. However, it should be understood that, with the camera 10 erected as shown in FIG. 2, the processing chamber would actually be situated in a position where it is retracted within camera outer wall 14.

Figure 6:
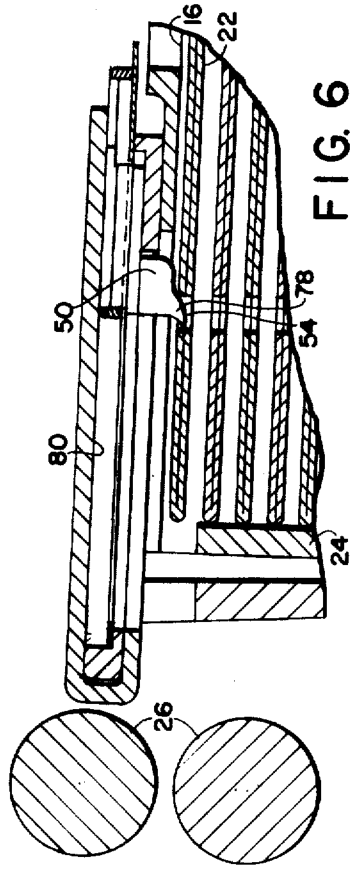
FIG. 6 is a fragmentary sectional view of the pick member of the present invention corresponding to the configuration of FIG. 3.
Figure 7:
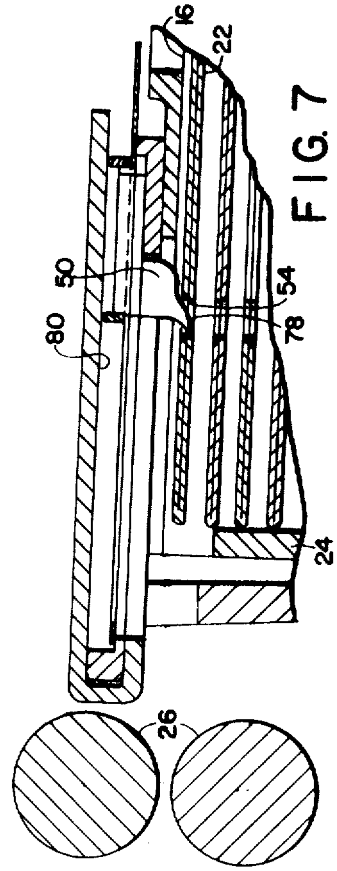
FIG. 7 is a fragmentary sectional view of the pick member of the present invention corresponding to the configuration of FIG. 4.
Figure 8:
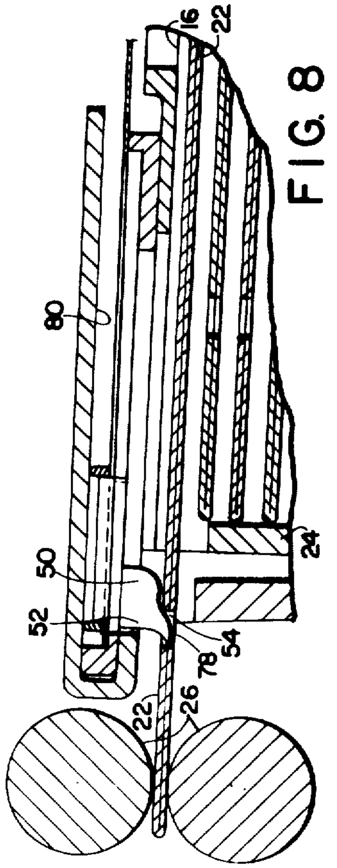
FIG. 8 is a fragmentary sectional view of the pick member of the present invention corresponding to the configuration of FIG. 5.

The camera 10 is operated to record a scene on a photosensitive element positioned on an exposure plane 16 which is best seen in FIGS. 6 through 8. Specifically, light entering lens 18 is reflected from a mirror, not shown, within bellows 20 and is directed toward exposure plane 16. A suitable shutter control mechanism is actuated in sequence to admit light through lens 18 and cycle the apparatus in a manner to be hereinafter described. The detailed description of camera 10 structurally and functionally is more clearly set forth in the aforementioned Ser. No. 763,883. The basic problem with which the present invention is concerned is moving the uppermost film unit 22 in container 24 into pressure-applying rollers 26 after exposure of that film unit. An examination of FIG. 1 illustrates the minimal space available between the top 28 of processing chamber 12 and bottom wall 30 of camera outer cover 32. The pick mechanism of the present invention, which is adapted to move the exposed film unit from the exposure position into pressure-applying rollers 26, must operate in this area of the camera. The fact that this area is extremely thin with respect to the space available necessitates a pick mechanism that has an operative area of extremely thin profile.

Figures 3, 4:
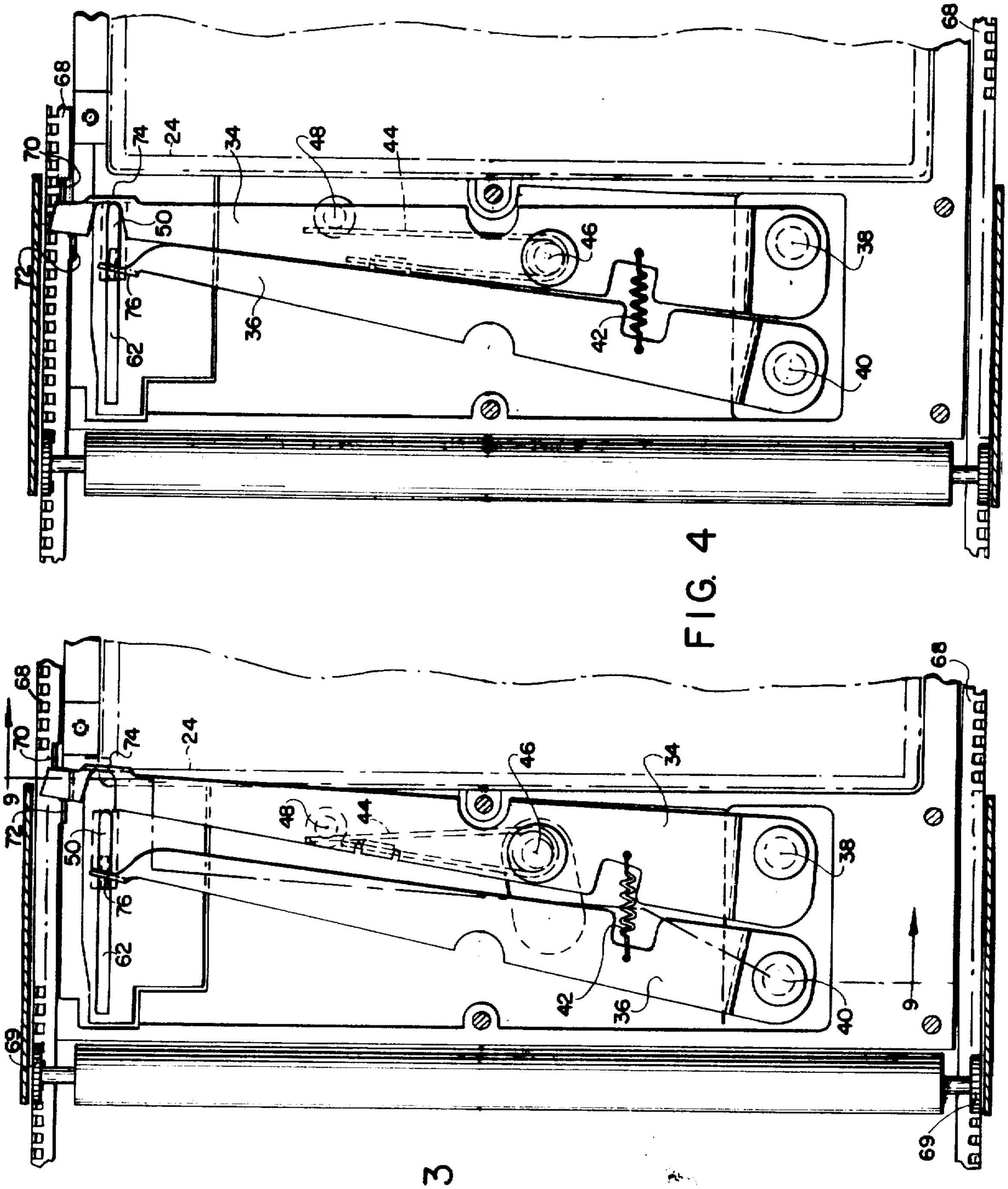
FIG. 3 is a sectional view illustrating the position of the pick mechanism of the present invention when the photographic apparatus is in the nonerected condition.
FIG. 4 is a sectional view with the pick mechanism of the present invention shown in the configuration it assumes when the camera is erected prior to the beginning of an operative cycle.
Figure 5:
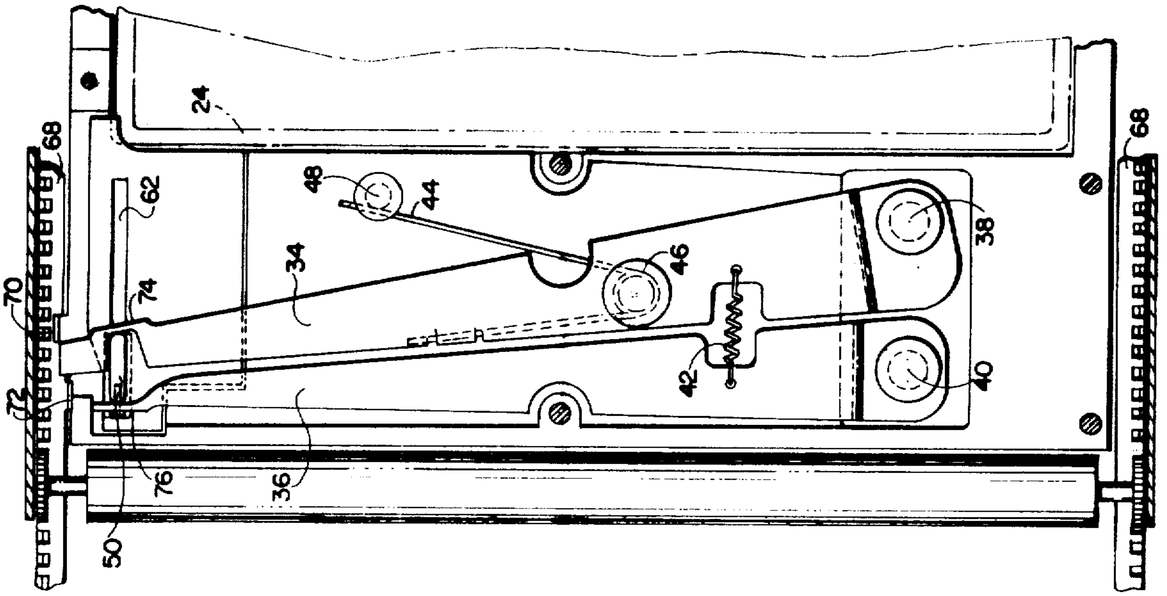
FIG. 5 is a sectional view with the pick mechanism of the present invention illustrated in the configuration is assumes at the end of an operative cycle.

Referring to FIGS. 3 through 9, a first embodiment of the present invention is shown. Arms 34 and 36 are pivoted at points 38 and 40, respectively. Spring 42 provides a biasing means which maintains arms 34 and 36 biased toward one another. Spring 44 is pivoted at point 46 and acts between lug 48 and arm 34 to urge arm 34 in a counterclockwise fashion as best illustrated in FIGS. 3 through 5.

Figure 9:
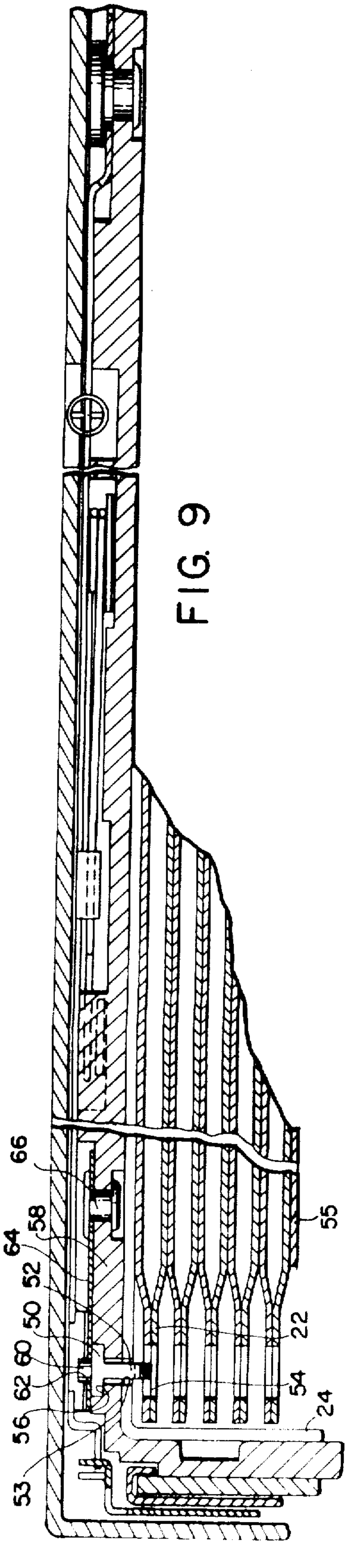
FIG. 9 is a fragmentary sectional view of the present invention taken along line 9—9 of FIG. 3.

Referring to FIG. 9, a slide element 50 includes a projection or extended element 52 which extends downwardly from the main body of the slide element 50 through a slit 53 in container 24 so as to engage an underlying slot 54 in the uppermost film unit 22 carried in container 24 along exposure plane 16. Extended element 52 can be integral with element 50 or can be attached thereto in any well-known fashion. Slots 54 are positioned in vertical alignment so that as an uppermost film unit is exposed and moved from the exposure plane, another film unit moves up to the exposure plane under the bias of spring 55 to position slot 54 properly. Slide element 50 slides along ways 56 formed in camera support structure 58. An upwardly extending lug 60, integrally formed with slide element 50, is guided in its movement by moving in slot 62 formed in resilient plate 64. Plate 64 is formed of any spring-type material, such as a ferrous material, and is riveted to camera support structure 58 as seen at 66. Plate 64 functions to resiliently maintain slide element 50 in ways 56 while allowing a certain modicum of movement of the slide element 50 in ways 56 in a plane normal to the plane of movement of slide element 50. Stated another way, extended element 52 must be allowed a certain upward movement with respect to the top surface of a given film unit as extended element 52 moves rearwardly across the top surface of a film unit to engage slot 54 in the next unexposed film unit. More specifically, extended element 52 must be capable of upward movement a distance at least equal to the amount of extension of extended element 52 into a given slot 54 in a film unit.

Rack means 68, also seen in FIG. 2, is formed as an upper portion of opposite sides of processing chamber 12 and consequently moves therewith. Pinion means 69 are rotatably carried by rollers 26 and engage rack means 68 to impart translationally reciprocable movement to rack means 68. Projections 70 and 72 extend upwardly from rack means 68 and provide drive means for the pick mechanism of the subject invention. More specifically and viewing FIG. 3, projection 70 is engageable with arm 34, and, during the operation of the subject camera, rack 68 will therefore move arm 34 to the left as viewed in FIG. 3. Projection 70 thereby drives arm 34 around pivot 38. On the return movement of the processing chamber 12, after it has reached its fullest extension, projection 72 engages an opposite side of arm 34 to move the entire pick mechanism to a poised position.

Arms 34 and 36, respectively, include downwardly extending flanges 74 and 76. These flanges are positioned so that they selectively engage slide element 50 to generate movement of slide element 50 in slot 62 along ways 56.

OPERATION OF FIRST EMBODIMENT

A suitable shutter mechanism is activated to expose the photosensitive portion of the uppermost film unit in container 24. Desirably, a cycling of the camera is carried out automatically as set forth in the previously mentioned Ser. No. 763,883. The processing chamber 12 is essentially of the same type described in my copending application Ser. No. 179. Referring to FIG. 3, arm 34 is shown in the position it assumes when camera 10 is in a nonerected condition. That is to say, the processing chamber 12, along with rack means 68, is shown in its fullest extremity of retraction in FIG. 3. When camera 10 is erected into the configuration shown in FIG. 2, processing chamber 12 and, consequently, rack means 68, moves outwardly a short distance due to the interrelationship of erecting linkage, not shown. This movement is on the order of 0.137 to 0.145 inches. As seen in FIG. 3, arm 36 is engaging slide element 50 which is at the furthermost extension of slot 62. Arm 34, however, is pulled away from slide element 50 against the bias of spring 42. Accordingly, there is a lost motion connection between arms 34 and 36 which is utilized when the subject camera is folded into a nonerected configuration.

Referring to FIG. 4, arm 34 is shown in a poised, operative position wherein flange 74 has moved into engagement with slide element 50. It is noted that slide element 50 is still disposed at the end of slot 62, in which position extended element 52 engages the forward end of slot 54 in the uppermost film unit 22 of container 24. Assuming that the appropriate shutter mechanism has been operated, processing chamber 12 proceeds to move outwardly of the main body of camera 10 as best described in my copending application Ser. No. 179. Referring to FIGS. 4 and 5, movement of rack means 68 causes projection 70 to drive arm 34 in a counterclockwise fashion around pivot 38. Spring 42 is drawing flanges 74 and 76 into biased engagement with opposite sides of slide element 50. Therefore, arms 34 and 36 and slide element 50 normally move as a unit. Additionally, spring 44 has been compressed by projection 72 acting against arm 34 at the end of the previous cycle. Consequently, any movement of rack means 68 to the left as viewed in FIG. 4 allows spring 44 to extend. The stored energy of spring 44 therefore acts against arm 34, assisting the mechanism driving rack means 68 in turn moving arm 34. This assist is an important feature of the present invention because, as previously stated, the motor driving the processing chamber 12 is more heavily loaded on the outward stroke of processing chamber 12 than on the return stroke thereof. Spring 44 assisting in the movement of the pick mechanism therefore balances the loading of the drive motor during a camera operating cycle.

Referring to FIG. 5, the first embodiment of the subject pick mechanism is shown in the position it assumes at the end of its operative stroke. It will be noted that the end of arm 34 previously engaged by projection 70 has pivoted sufficiently to allow rack means 68, along with projection 70, to clear the end of arm 34 as the processing chamber 12 continues in its outward movement. The position of the pick mechanism as shown in FIG. 5 corresponds to the configuration of parts shown in FIG. 8 with extended element 52 shown at an extreme of its travel and film unit 22 entering the bite of rollers 26. Therefore, rack means 68 is free to continue its movement outwardly of the camera body and the pick mechanism is disabled. Spring 44 now serves to maintain slide element 50 at a forward extreme of its movement in slot 62 so that the end of arm 34 is maintained at a position wherein it is picked up by projection 72 during the return movement of rack means 68.

After processing chamber 12 has reached its outward extreme of movement, suitable motor-reversing means operates to reversely drive rack means 68. Of course, at this juncture the exposed film unit 22 has completely passed through rollers 26 and is being moved to a storage position within camera 10. As rack means 68 nears its opposite or inward extreme of movement, projection 72 picks up arm 34 and drives it toward the position shown in FIG. 4. Spring 42 engaging arms 34 and 36 causes arm 36 to follow this movement. Flange 76 engages slide element 50 and moves it toward the opposite end of slot 62. When arms 34 and 36 assume the position shown in FIG. 4, slide element 50 has been driven to its opposite extreme of movement in slot 62, and extended element 52 has engaged a slot 54 in the next unexposed film unit. This reengagement is brought about due to cam surface 78 formed on the rearward portion of extended element 52. From an examination of FIGS. 6 through 8, it is seen that, as slide element 50 is moved from the position shown in FIG. 8 toward the position shown in FIG. 6, cam surface 78 rides up on the top surface of the succeeding film unit 22 which results in slide element 50 being pushed toward wall 80 against the bias of resilient plate 64. Of course, when extended element 52 reaches slot 54 in the uppermost film unit, resilient plate 64 drives extended element 52 downwardly to engage that film unit, readying the pick mechanism for another cycle. It should also be noted that on the return movement of rack means 68, arm 34 is driven to the position shown in FIG. 4 against the bias of spring 44. This is a portion of the cycle during which the load on a drive motor is at a minimum, and, therefore, the recocking of spring 44 is accomplished without inordinately loading the motor. Therefore, rack means 68, formed as a portion of processing chamber 12, drives means comprising slide element 50, arms 34 and 36, and extended element 52 which engages an exposed photosensitive element 22 from a position of exposure to a position intermediate the exposure and storage position. The intermediate position is a position where an exposed film unit enters the bite of rollers 26.

Figure 11:
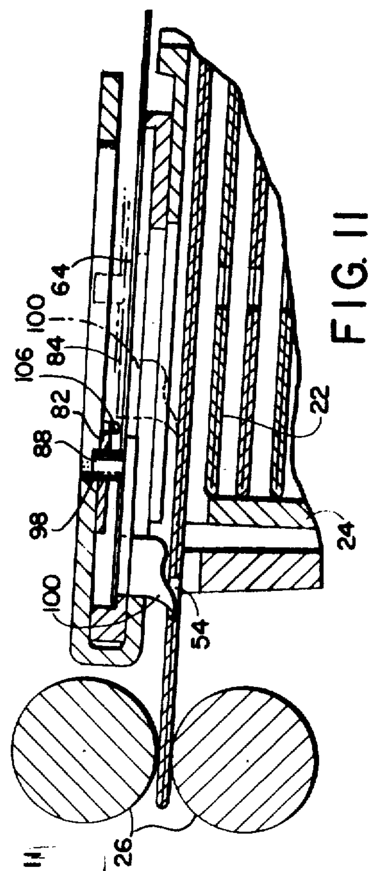
FIG. 11 is a fragmentary sectional view of the embodiment of FIG. 10 with the pick member shown in a plurality of operative positions.
Figure 10:
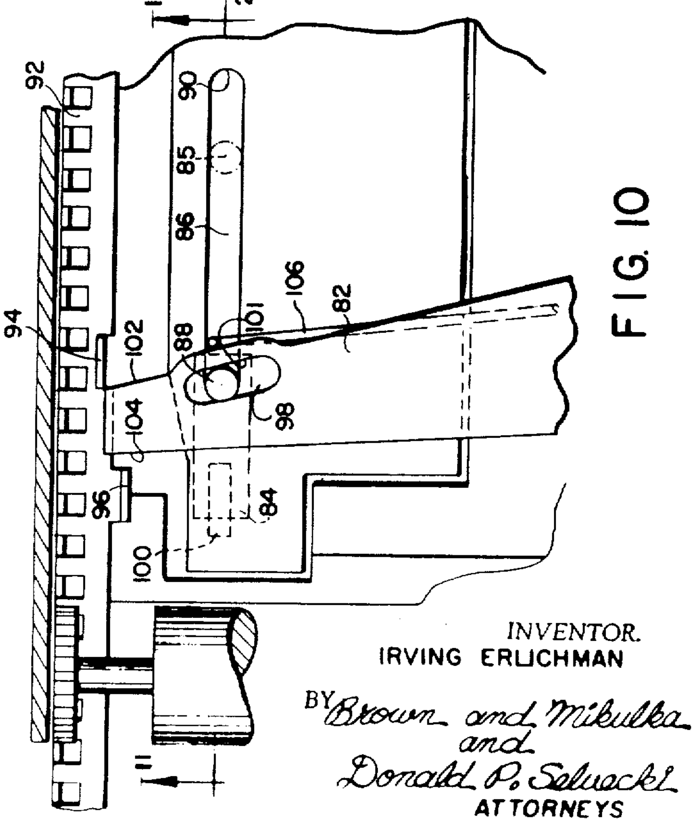
FIG. 10 is a fragmentary plan view of another embodiment of the present invention.

Referring to FIGS. 10 and 11, a second embodiment of the present invention is illustrated. A single arm 82 is mounted for pivotal movement so that the arm moves on a plane parallel to the plane of movement of the processing chamber 12. This plane of movement is similar to the plane of movement of arms 34 and 36 in the embodiment of FIGS. 3 through 8. Slide element 84 is mounted for movement in slot 86 in similar fashion to the previous embodiment. However, slot 86 is longer than needed to accommodate the normal operative movement of slide element 84. That is to say, the dotted line position 85 of drive lug 88 shown in FIG. 10 is the operative, poised position of lug 88 and is advanced from the rearward extreme 90 of slot 86 so as to accommodate a given amount of movement of arm 82 generated by rack 92 during the folding of the camera. This is similar to the previous embodiment which had an arrangement of a spring carried between a pair of arms so as to allow movement of one arm relative to a stationary slide element when the camera is folded, and the processing chamber moved into a stored configuration. As previously stated, this amount of movement is approximately 0.137 to 0.145 inches.

Projections 94 and 96 are similar to projections 74 and 76 of the previous embodiment in that projection 94 drives arm 82 pivotally in a counterclockwise direction as viewed in FIG.

10, and projection 96 moves arm 82 clockwise in a return movement to a poised position and further into a stored position against extreme 90 of slot 86 during camera folding. It should be noted that arm 82 has an aperture 98 formed therein which traps drive lug 88. Therefore, slide element 84 follows the movement of arm 82.

OPERATION OF SECOND EMBODIMENT

The uppermost film unit 22 in container 24 is constantly engaged by a downwardly extending projection 100 which is very similar to the extended element 52 of the previously described embodiment. As arm 82 is pivotally moved to an operative, poised position from a stored position during camera erection, edge 101 of aperture 98 engages lug 88. This position is defined by the dotted line position in slot 86 of drive lug 88. After light from a scene to be recorded is directed to the photosensitive element portion of the uppermost film unit 22, cycling apparatus, such as shown in my copending application Ser. No. 763,883, cycles to initiate the movement of processing chamber 12. The initial movement of processing chamber 12 carries rack 92 to the left as viewed in FIG. 10, and projection 94 picks up arm 82 on surface 102.

Drive lug 88 engages edge 101 of aperture 98, and, therefore, slide element 84 is driven toward the left in slot 86 as viewed in FIG. 10. Slide element 84 eventually moves to an extreme position in slot 86, at which point the film unit 22 previously exposed enters the bite of rollers 26. Further movement of the film unit is generated by the rollers 26, and, at this extreme of movement, the pick mechanism is disabled.

After the processing chamber 12 has completed its outward cycle and is reversed, projection 96 picks up arm 82 by engaging surface 104 thereof, driving arm 82 to a poised position. It should be understood that a spring 106, such as partially shown in FIG. 11, biases arm 82 to the left as viewed in FIG. 10 and functions essentially the same as spring 44 in the previous embodiment. When projection 100 has reached a point in slot 86 defined by the dotted line position of drive lug 88, projection 100 engages a slot 54 of the succeeding film unit 22 to be exposed. It should be noted that projection 100 is shown in dotted line form in FIG. 11 in the position it assumes crossing the upper surface of the next film unit to be engaged prior to dropping into one of the slots 54 on the return movement of slide element 84. That is to say, the resilient plate 64 allows an upward deflection of projection 100 sufficient to permit a film unit to pass beneath projection 100 after rollers 26 drive an exposed film unit from container 24.

Figure 13:
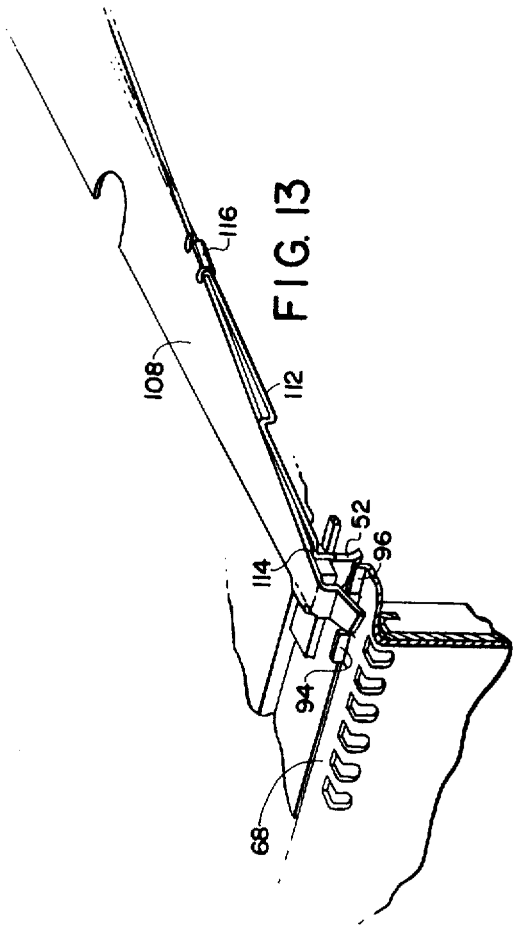
FIG. 13 is a fragmentary perspective view of the embodiment of FIG. 12.
Figure 12:
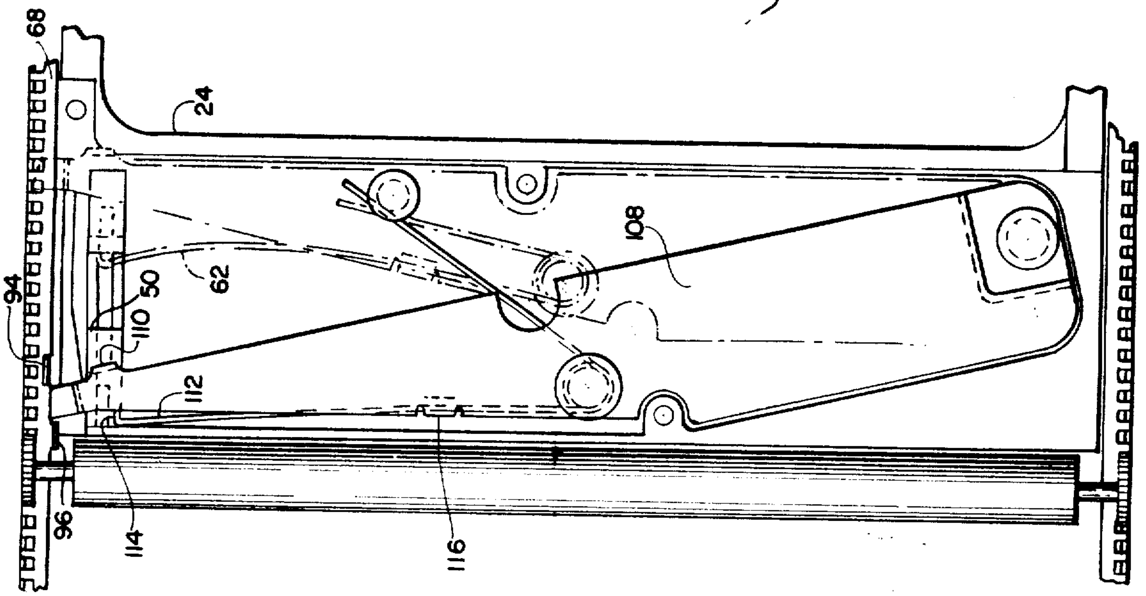
FIG. 12 is a sectional view of another embodiment of the present invention in several operative positions similar to the views of FIGS. 3–5.

Referring to FIGS. 12 and 13, another embodiment of the present invention is illustrated wherein a single arm 108 pivots in similar fashion to the embodiment shown in FIG. 10 but with slide element 50 being trapped between a downwardly extending flange 110 and spring 112. The other portions of the pick structure and camera structure are identical to the structure of the previous embodiments.

OPERATION OF THIRD EMBODIMENT

The camera 10 is cycled similar to the manner described in the previous embodiments wherein rack 68 moves to the left as viewed in FIG. 12. Projection 94 picks up arm 108 and drives it from the dotted line position shown in FIG. 12 to the solid line position shown therein. When arm 108 pivots, flange 110 engages slide element 50 and moves it to the end of slot 62 to the position shown in solid lines in FIG. 12. At this point the end of arm 108 swings clear of projection 94, and rack 68 of processing chamber 12 continues to move outward to its extreme of movement in that direction. After a suitable reversing mechanism operates, rack 68 moves to the right as seen in FIG. 12 until projection 96 engages the opposite side of arm 108 from that engaged by projection 94 and moves slide element 50 to the right extreme of slot 62. At this point, another film unit is engaged as extended element 52 drops into the uppermost film unit 22 in container 24. Therefore, arm 108 is positioned so that another operative cycle can begin.

It is noted that slide element 50 is trapped between flange 110 and end 114 of spring 112. Spring 112 also engages arm 108 at the back-turned flange 116 integrally formed with arm 108. Therefore, when arm 108 reaches its poised position, slide element 50 has reached the end of slot 62 and cannot move further. However, during the folding of the camera, rack 68 is driven further to the right as viewed in FIG. 12, which naturally carries arm 108 therewith. End 114 continues to engage slide element 50 at the end of slot 62, but arm 108 is moved against the bias of spring 112 into a stored configuration. Spring 112, therefore, has the dual function of biasing arm 108 to the left as viewed in FIG. 12, similar to the function of spring 44 in the first embodiment, as well as providing a lost motion connection between arm 108 and slide element 50. Therefore, in the third embodiment the pick mechanism also has the feature present in the first two embodiments of providing a spring to assist the pivotal movement of the pick-drive arm during its operative movement in transporting a film unit from an exposure position to the intermediate position where rollers 26 take over the movement of the exposed film unit and the processing chamber 12.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus of the type including processing chamber means wherein a photosensitive element is supported in position for exposure and then transported to a storage position within the photographic apparatus after exposure, the improvement comprising:

means for driving said processing chamber means;

means engageable with a photosensitive element and driven by said processing chamber means for moving an exposed photosensitive element from said exposure position to a position intermediate said exposure position and said storage position, said engageable means including biasing means for assisting said driving means in driving said processing chamber means during initial movement of the photosensitive element from said exposure position to said intermediate position.

2. The improvement according to claim 1 wherein during movement of the photosensitive element from said intermediate position to said storage position, said processing chamber means transmits an amount of energy to said biasing means sufficient to enable said biasing means to assist said processing chamber means in moving the next succeeding photosensitive element from said exposure position to said intermediate position.

3. In photographic apparatus of the type including processing chamber means wherein a photosensitive element is supported for exposure and then transported to a storage position within the photographic apparatus after exposure, the improvement comprising:

means engageable with a photosensitive element and driven by said processing chamber means for moving an exposed photosensitive element from a position of exposure to a position intermediate said exposure position and said storage position;

said engageable means comprises at least one arm engageable by said processing chamber means for generating movement of an exposed photosensitive element between two extremes of movement respectively corresponding to said exposure position and said intermediate position and a slide element, said arm being pivoted near a first end thereof, and a second end of said arm cooperating with said slide element, whereby said slide element moves between two extremes of movement respectively corresponding to said exposure position and said intermediate position of the photosensitive element.

4. The improvement according to claim 3 and further including an extended element wherein said slide element carries said extended element thereon engageable with a slot in the photosensitive element, said arm engaging said slide element whereby an exposed photosensitive element is transported from an exposure position to said intermediate position.

5. In photographic apparatus of the type including processing chamber means wherein a photosensitive element is supported for exposure and then transported to a storage position within the photographic apparatus after exposure, the improvement comprising:

means engageable with a photosensitive element and driven by said processing chamber means for moving an exposed photosensitive element from a position of exposure to a position intermediate said exposure position and said storage position;

said processing chamber means includes rack means and pinion means, said pinion means being rotatably carried by the photographic apparatus; and said rack means includes projections, at least one of said projections cooperating with said engageable means during transportation of an exposed photosensitive element from the exposure position to said intermediate position, another of said projections cooperating with said engageable means to move said engageable means to a position where a second photosensitive element is engaged under one condition of operation, said other projection moving said engageable means to a storage position under a second condition of operation.

6. The improvement according to claim 5 wherein said engageable means includes arm means movable by said projections between extremes of movement, said arm means being disengaged from said rack means as said arm means reaches a first extreme of movement.

7. The improvement according to claim 6 wherein said arm means includes at least one pivotable arm and wherein said projections are offset with respect to one another relative to the direction of movement of said rack means whereby said projections selectively engage at least one pivotable arm as said rack means moves said last-mentioned means between said exposure and intermediate positions.

8. The improvement according to claim 6 wherein said photographic apparatus includes pressure-applying means and said pinion means is rotatably carried by said pressure-applying means, said pressure-applying means being selectively reversably driven in two directions whereby said rack means is moved from a position of rest to drive an exposed photosensitive element from the exposure position to said intermediate position corresponding to a position where an exposed photosensitive element enters said pressure-applying means and said pivotable arm is disengaged from said projections and thereby disabled, said arm being reengaged by one of said projections as said rack means reciprocates to a position of rest.

9. In photographic apparatus of the type including processing chamber means wherein a photosensitive element is supported for exposure and then transported to a storage position within the photographic apparatus after exposure, the improvement comprising:

means engageable with a photosensitive element and driven by said processing chamber means for moving an exposed photosensitive element from a position of exposure to a position intermediate said exposure position and said storage position;

said engageable means includes an extended element adapted to engage an aperture in the photosensitive element, whereby movement of said engageable means induces movement in the photosensitive element from the exposure position to said intermediate position and a slide element wherein said extended element is carried by said slide element and movable between two extremes of movement in a slot respectively corresponding to said two positions of the photosensitive element.

10. The improvement according to claim 9 wherein said engageable means includes at least one pivotable arm and a spring element engageable therewith to urge at least said one pivotable arm toward a first extreme of movement where said slide element moves to an end of said slot in a first direction and the photosensitive element reaches said intermediate position.

11. The improvement according to claim 10 wherein said slide element includes an upwardly extending projection adapted to be engaged by at least one arm whereby said slide element is translationally moved in said slot.

12. The improvement according to claim 10 wherein one arm includes a slot formed therein and said slide element includes a projection engageable with said slot whereby said arm is trapped in engagement with said slide element.

13. In photographic apparatus of the type including processing chamber means wherein a photosensitive element is supported for exposure and then transported to a storage position within the photographic apparatus after exposure, the improvement comprising:

means engageable with a photosensitive element and driven by said processing chamber means for moving an exposed photosensitive element from a position of exposure to a position intermediate said exposure position and said storage position;

said engageable means includes means for biasing and a pivotable arm wherein said means for biasing engages said pivotable arm to urge said pivotable arm in the direction of movement of the photosensitive element throughout the range of movement of said engageable means.

14. The improvement according to claim 13 and further including a slide element and a rack having projections thereon, said pivotable arm being trapped between said projections whereby said slide element is driven throughout the range of movement of said pivotable arm.

15. The improvement according to claim 13 and further including a slide element wherein said pivotable arm has a slot formed therein, said slide element having a portion cooperating with said slot to adapt linear movement of said slide element while said arm moves in an arcuate path.

16. The improvement according to claim 14 wherein said processing chamber means includes raid rack having projections thereon, said projections being offset with respect to each other along the path of movement of said rack whereby at least one arm is selectively trapped therebetween as said processing chamber means reciprocates.

17. In photographic apparatus of the type including processing chamber means wherein a photosensitive element is supported for exposure and then transported to a storage position within the photographic apparatus after exposure, the improvement comprising:

means engageable with a photosensitive element and driven by said processing chamber means for moving an exposed photosensitive element from a position of exposure to a position intermediate said exposure position and said storage position, said engageable means includes two pivotable arms and means for biasing one of said arms in the direction of movement of the photosensitive element.

18. The improvement according to claim 17 and further including biasing means connecting said pivotable arms at points intermediate their ends whereby said arms move as a unit as the photosensitive element moves between said exposure and intermediate positions, at least one of said arms moving independently of said other arm as the photographic apparatus assumes an inoperative condition.

19. The improvement according to claim 17 and further including a slide element, a first of said pivotable arms having a downwardly projecting portion engaging a first end of said slide element and a second of said pivotable arms having a downwardly projecting portion engaging a second end of said slide element whereby said slide element is trapped between said downwardly projecting portions and responds to movement of said pivotable arms within a predetermined range corresponding to the distance between said exposure and said intermediate positions.

20. The improvement according to claim 18 and further including a slide element and rack means having projections formed thereon cooperating with at least one of said pivotable arms as said rack means reciprocates, said projections being positioned on said rack means near the periphery of the path of movement of said pivotable arms whereby said pivotable arms are selectively engaged and disengaged from said projections as said rack means reciprocates whereby a first exposed photosensitive element is moved from the exposure position to said intermediate position and said pivotable arms are repositioned so that said slide element engages a second photosensitive element during cycling of the photographic apparatus.

21. The improvement according to claim 18 further including a slide element said slide element includes a downwardly extending projection adapted to engage a photosensitive element whereby pivotal movement of said arms moves said slide element and said photosensitive element from said exposure position to said intermediate position.

22. The improvement according to claim 20 wherein said biasing means constantly urges said arms in the direction of movement of said rack means as a first photosensitive element is moved to said intermediate position, said rack means returning said pivotable arms to a position wherein a second photosensitive element is engaged and poised for movement to said intermediate position.

* * * * *